US006980675B2

(12) United States Patent
Evron et al.

(10) Patent No.: US 6,980,675 B2
(45) Date of Patent: Dec. 27, 2005

(54) METHOD FOR PROCESSING IMAGES OF CORONARY ARTERIES

(75) Inventors: Rami Evron, Tel Aviv (IL); Ran Carmeli, Magshimim (IL); Moshe Kleiman, Rehovot (IL)

(73) Assignee: Paieon, Inc., New York, NY (US)

( * ) Notice: Subject to any disclaimer, the term of this patent is extended or adjusted under 35 U.S.C. 154(b) by 785 days.

(21) Appl. No.: 09/829,425

(22) Filed: Apr. 10, 2001

(65) Prior Publication Data

US 2002/0057825 A1 May 16, 2002

Related U.S. Application Data

(60) Provisional application No. 60/240,956, filed on Oct. 18, 2000.

(51) Int. Cl.[7] ................................. G06K 9/00
(52) U.S. Cl. .................................... 382/128
(58) Field of Search ................. 382/128–134, 382/154; 600/381

(56) References Cited

U.S. PATENT DOCUMENTS

| | | | | |
|---|---|---|---|---|
| 4,890,310 A | * | 12/1989 | Umetani et al. | 378/82 |
| 5,872,861 A | * | 2/1999 | Makram-Ebeid | 382/130 |
| 6,047,080 A | * | 4/2000 | Chen et al. | 382/128 |
| 6,047,090 A | * | 4/2000 | Makram-Ebeid | 382/257 |
| 6,377,835 B1 | * | 4/2002 | Schoenberg et al. | 600/419 |

OTHER PUBLICATIONS

Kayikcioglu, et al., "Unique Determination of Shape and Area of Coronary Arterial Cross–Section from Biplane Angiograms," IEEE, 1992, pp. 596–603.*

* cited by examiner

*Primary Examiner*—Daniel Miriam
*Assistant Examiner*—Shefali Patel
(74) *Attorney, Agent, or Firm*—Browdy and Neimark, P.L.L.C.

(57) ABSTRACT

A method for processing an image of coronary arteries given by an intensity function $I(x,y)$. A function $z(x,y)$ is obtained describing the heart surface. The image is then processed to produce an image having an intensity function $I'(x,y)$ where $I'$ is obtained in a calculation involving the function z. The method may be used to enhance the stereoscopic effect of a stereo pair of images of coronary arteries.

21 Claims, 1 Drawing Sheet

METHOD FOR PROCESSING IMAGES OF CORONARY ARTERIES

The present application claims the benefit of U.S. Provisional Appln. No. 60/240,956, filed Oct. 18, 2000.

FIELD OF THE INVENTION

This invention relates to angiographic imaging.

BACKGROUND OF THE INVENTION

There are many instances when it is desirable to have a stereoscopic view of the coronary arteries. For example, an intraluminal device such as a balloon or stent must be navigated through the coronary arterial tree to a diseased location in an artery. Stereoscopic monitoring of the location of the device in the arterial tree assists the angiographer in navigating the device through the coronary tree.

In order to obtain a stereoscopic view of the coronary arteries, it is known to obtain two two-dimensional images of the arteries from different perspectives. The two images are then presented to a viewer for stereoscopic viewing as is known in the art.

Angiographic imaging of the coronary arteries involves introducing a radio-opaque substance into one or more coronary arteries. An x-ray source is directed to the heart. An x-ray recorder, such as x-ray film or an x-ray camera, located behind the heart thus record an image of the coronary arteries from this perspective. To obtain a second image from another perspective, the x-ray source and recorder may be rotated about the heart to a new position and a second image of the coronary arteries obtained. It is also known to produce a pair of images of the coronary arteries from different perspectives without moving the x-ray source or recorder by taking advantage of the fact that when the heartbeats, it rotates slightly. A cineangiographic system having a stationary x-ray video camera is used to produce and record a sequence of images of the coronary arteries over at least one systole-diastole or diastole-systole transformation of the heart. A pair of images in the video record is then selected from the sequence presenting images of the coronary arteries from different perspectives due to rotation of the heart. However, the angular displacement of the perspectives of the two images cannot be greater than the rotational angle of the heart in a single diastole-systole or systole-diastole transformation (about 1°). This small angular displacement of the two perspectives does not produce a satisfactory stereoscopic effect.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DESCRIPTION OF THE INVENTION

The present invention provides a method for processing a pair of initial images of the coronary arteries obtained from different perspectives in order to enhance the stereoscopic effect perceived by an observer of the images. The pair of images to be processed may have been obtained from two perspectives of the body. Alternatively, the pair of images may have been obtained from a single perspective of the body but showing different perspectives of the coronary arteries due to rotation of the heart.

Each image in the initial pair of images is described by means of an intensity function $I(x,y)$ which gives the intensity of the image at the pixel $(x,y)$. The image is considered as lying in the xy plane in a three dimensional system of coordinates $(x,y,z)$, and representing a projection of the coronary arteries onto this plane.

In accordance with the invention, the boundary of the heart in each image is used to generate a function $z(x,y)$ describing the heart surface over the xy plane. The image $I(x,y)$ is then processed to produce a processed image having an intensity function $I'(x,y)$ where, for each pixel $(x,y)$, $I'(x,y)$ is obtained in a calculation involving $I(x,y)$ and $z(x,y)$.

In a preferred embodiment, a function $z(x,y)$ describing an ellipsoidal surface is used. The ellipsoidal surface has a first axis and a second axis equal to, and coinciding with, the length and width, respectively, of the heart in the plane of the image. The third axis of the ellipsoid, representing the depth of the heart in a direction perpendicular to the plane of the image, is obtained from either the first or second axis based upon the proportions of a normally shaped heart. The depth may be taken, for example, as 0.3 to 0.8 times the length of the first axis.

In the most preferred embodiment, the intensity $I'(x,y)$ of the processed image at the pixel $(x,y)$ is obtained from the function $z(x,y)$ representing an ellipsoidal heart surface and the intensity $I(x,y)$ of the initial image according to the algebraic expression:

$$I'(x, y) = \left[\frac{z(x, y)}{\alpha} + 1\right] I(x, y),$$

where $\alpha$ is a selectable scaling factor.

Once the two initial images have been processed in accordance with the invention, the processed images may be presented to an observer for stereoscopic viewing by any method known in the art. For example, one image may be presented in a red and black format while the second image is presented in a green and black format. In this case, the observer is provided with a pair of eye glasses that in use place a red filter and a green filter over the eye that is to view the red and green image, respectively. Alternatively, the two processed images may be displayed using polarized light where the planes of the polarized light of the two images are perpendicular to each other and the images are viewed with glasses having perpendicular polarizers. A stereoscopic screen may also be used for stereoscopic viewing of the images.

Figure 1A:
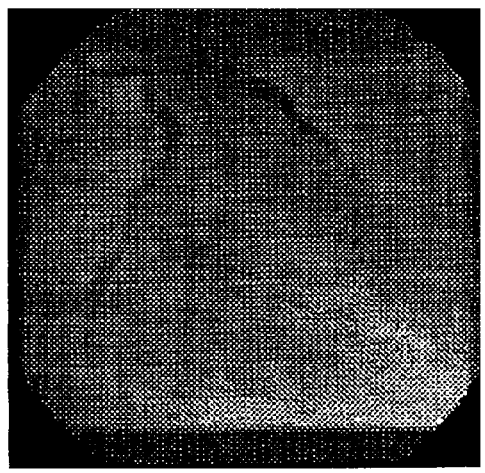
FIGS. 1a and 1b are images of human coronary arteries obtained from a single camera position but from different perspectives due to rotation of the heart.
Figure 1B:
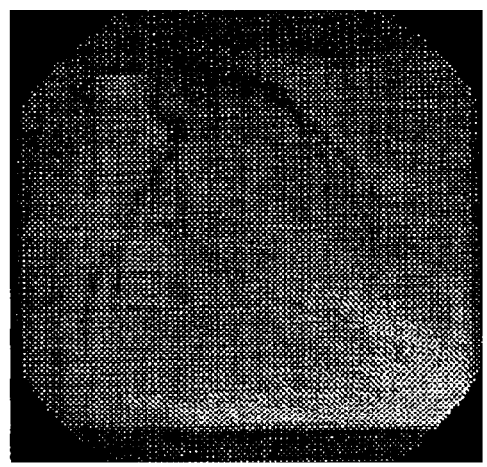

FIGS. 1a and 1b are initial images of human coronary arteries obtained from a single perspective of the body. The two images were obtained at different stage of the heartbeat, so that the two perspectives of the heart are separated by an angle of about 1°. The two images were processed according to the invention, using the equation:

$$I'(x, y) = \left[\frac{z(x, y)}{\alpha} + 1\right] I(x, y),$$

where

-continued $$z(x, y) = c\sqrt{1 - \left(\frac{x^2}{a^2}\right) - \left(\frac{y^2}{b^2}\right)}$$

with α=0.7 and a=1.2b=2c

Figure 1C:
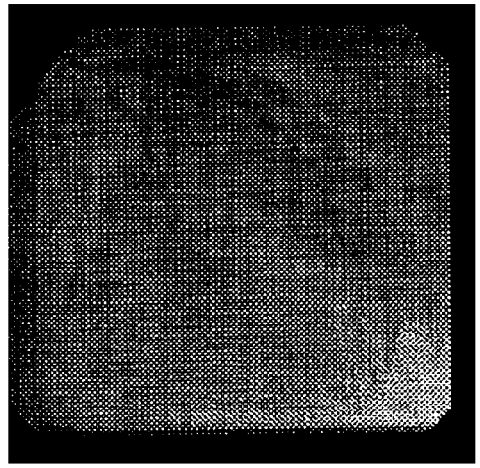
FIG. 1c is a superimposition of two images obtained by processing the images of FIGS. 1a and 1b in accordance with the invention.

FIG. 1c shows a superimposition of the two processed images. The superimposition may be constructed so that one processed image in the superimposition is red and black, while the other is green and black. The superimposition can then be viewed using a pair of eyeglasses having a red filter to cover one eye and a green filter to cover the other eye. Alternatively, the images could be presented on a screen with polarized light, with the planes of polarization of the two images being perpendicular to each other, and the screen viewed with eyeglasses having appropriate polarizers. The images may also be viewed on a stereoscopic viewing screen.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

In its first aspect the invention provides a method for processing an initial image of coronary arteries, the initial image given by an intensity function I(x,y) defined on a set of pixels (x,y), so as to produce a processed image of the coronary arteries having an intensity function I'(x,y), comprising steps of:

(a) obtaining a function z(x,y) describing a heart surface over the initial image; and (b) calculating the intensity function I' based upon the function z.

By another aspect the invention provides a program storage device readable by machine, tangibly embodying a program of instructions executable by the machine to perform method steps for processing a first initial digital image of coronary arteries and a second initial digital image of the coronary arteries, the first and second digital having been obtained from different perspectives of the coronary arteries, so as to produce a first processed image and a second processed image, the method comprising steps of:

(a) processing the first initial digital image by the method of the invention; and (b) processing the second digital image by the method of the invention.

Still further the invention provides a computer program product comprising a computer useable medium having computer readable program coded embodied therein for processing a first initial digital image of coronary arteries and a second initial digital image of the coronary arteries, he first and second digital images having been obtained from different perspectives of the coronary arteries, so as to produce a first processed image and a second processed image, the computer program product comprising:

computer readable program code for causing the computer to process the first initial digital image by the method of the invention; and computer readable program code for causing the computer to process the second digital image by the method of the invention.

What is claimed is:

1. A method for processing an initial image of coronary arteries, the initial image given by an intensity function I(x,y) defined on a set of pixels (x,y), so as to produce a processed image of the coronary arteries having an intensity function I'(x,y), comprising:

(a) obtaining a function z(x,y) bounding a heart surface within the initial image; and (b) calculating the intensity function I' based upon the function z, wherein the function z(x,y) describes an ellipsoidal surface over the initial image.

2. The method according to claim 1 wherein the ellipsoidal surface has a first axis and a second axis coinciding with a length and width, respectively, of the heart in the initial image, and a third axis perpendicular to the image.

3. The method according to claim 2 wherein the third axis has a predetermined constant times the length of the first or second axis.

4. The method according to claim 3 wherein the predetermined constant is from about 0.3 to about 0.8 times the length of the first axis.

5. The method according to claim 1 wherein I'(x,y) is given by the following algebraic expression $$I'(x, y) = \left[\frac{z(x, y)}{\alpha} + 1\right]I(x, y),$$

wherein α is a predetermined constant.

6. The method according to claim 5, wherein α is from about 0.1 to about 5.

7. A method for processing a first initial digital image of coronary arteries and a second initial digital image of the coronary arteries, the first and second digital images having been obtained from different perspectives of the arteries, the method comprising:

(a) processing the first initial digital image by the method of claim 1 so as to produce a first processed image; and (b) processing the second digital image by the method of claim 1 so as to produce a second processed image.

8. The method according to claim 7 further comprising presenting the first and second processed images for stereoscopic viewing.

9. A program storage device readable by machine, tangibly embodying a program of instructions executable by the machine to perform method steps for processing a first initial digital image of coronary arteries and a second initial digital image of the coronary arteries, the first and second digital having been obtained from different perspectives of the coronary arteries, the method comprising:

(a) processing the first initial digital image by the method of claim 1 so as to produce a first processed image; and (b) processing the second digital image by the method of claim 1 so as to produce a second processed image.

10. A computer program product comprising a computer useable medium having computer readable program code embodied therein for processing a first initial digital image of coronary arteries and a second initial digital image of the coronary arteries, the first and second digital images having been obtained from different perspectives of the coronary arteries, the computer program product comprising:

computer readable program code for causing the computer to process the first initial digital image by the method of claim 1 so as to produce a first processed image; and computer readable program code for causing the computer to process the second digital image by the method of claim 1 so as to produce a second processed image.

11. A computer program product comprising a computer useable medium having computer readable program code embodied therein for processing an initial image of coronary arteries, the initial image given by an intensity function I(x,y) defined on a set of pixels (x,y), so as to produce a processed image of the coronary arteries having an intensity function I'(x,y), the computer program product comprising:
- computer readable program code for causing the computer to obtain a function z(x,y) bounding a heart surface within the initial image; and
- computer readable program code for causing the computer to calculate the intensity function I' based upon the function z, wherein the function z(x,y) describes an ellipsoidal surface over the initial image.

12. A method for processing a single image of coronary arteries, the single image having an intensity function I(x,y) defined on a set of pixels (x,y), so as to produce a pseudo 3-dimensional image of a patient's heart, the method comprising:
- (a) obtaining a function z(x,y) corresponding to a boundary surrounding a surface of the patient's heart within said image; and
- (b) calculating an intensity function I'(x,y) of all pixels within said boundary based upon the function z so that pixel intensity is indicative of a depth of respective pixels constituting the coronary arteries, wherein the function z(x,y) describes an ellipsoidal surface over the single image.

13. The method according to claim 12, wherein the ellipsoidal surface has a first axis and a second axis coinciding with a length and width, respectively, of the patient's heart in the image, and a third axis perpendicular to the image.

14. The method according to claim 13, wherein the third axis has a predetermined constant times the length of the first or second axis.

15. The method according to claim 14, wherein the predetermined constant is from about 0.3 to about 0.8 times the length of the first axis.

16. The method according to claim 12, wherein I'(x,y) is given by the following algebraic expression:

$$I'(x, y) = \left[\frac{z(x, y)}{\alpha} + 1\right] I(x, y),$$

wherein $\alpha$ is a predetermined constant.

17. The method according to claim 16, wherein $\alpha$ is from about 0.1 to about 5.

18. A method for processing a first initial digital image of coronary arteries and a second initial digital image of the coronary arteries, the first and second digital images having been obtained from different perspectives of the arteries, the method comprising:
- (a) processing the first initial digital image by the method of claim 12 so as to produce a first processed image; and
- (b) processing the second digital image by the method of claim 12 so as to produce a second processed image.

19. The method according to claim 18 further comprising presenting the first and second processed images for stereoscopic viewing.

20. A program storage device readable by machine, tangibly embodying a program of instructions executable by the machine to perform method steps for processing a single image of coronary arteries, the single image having an intensity function I(x,y) defined on a set of pixels (x,y), so as to produce a pseudo 3-dimensional image of a patient's heart, the method comprising:
- (a) obtaining a function z(x,y) corresponding to a boundary surrounding a surface of the patient's heart within said image; and
- (b) calculating an intensity function I'(x,y) of all pixels within said boundary based upon the function z so that pixel intensity is indicative of a depth of respective pixels constituting the coronary arteries, wherein the function z(x,y) describes an ellipsoidal surface over the single image.

21. A computer program product comprising a computer useable medium having computer readable program code embodied therein for processing a single image of coronary arteries, the single image having an intensity function I(x,y) defined on a set of pixels (x,y), so as to produce a pseudo 3-dimensional image of a patient's heart, the computer program product comprising:
- computer readable program code for causing the computer to obtain a function z(x,y) corresponding to a boundary surrounding a surface of the patient's heart within said image; and
- computer readable program code for causing the computer to calculate an intensity function I'(x,y) of all pixels within said boundary based upon the function z so that pixel intensity is indicative of a depth of respective pixels constituting the coronary arteries, wherein the function z(x,y) describes an ellipsoidal surface over the single image.

* * * * *